United States Patent
Ha

(10) Patent No.: US 11,969,897 B2
(45) Date of Patent: Apr. 30, 2024

(54) METHOD, SYSTEM, AND NON-TRANSITORY COMPUTER-READABLE RECORDING MEDIUM FOR CONTROLLING A SERVING ROBOT

(71) Applicant: Bear Robotics, Inc., Redwood City, CA (US)

(72) Inventor: John Jungwoo Ha, Frisco, TX (US)

(73) Assignee: Bear Robotics, Inc., Redwood City, CA (US)

( * ) Notice: Subject to any disclaimer, the term of this patent is extended or adjusted under 35 U.S.C. 154(b) by 209 days.

(21) Appl. No.: 17/375,334

(22) Filed: Jul. 14, 2021

(65) Prior Publication Data

US 2023/0014212 A1 Jan. 19, 2023

(51) Int. Cl.
*B25J 9/16* (2006.01)
*G05B 19/4155* (2006.01)

(52) U.S. Cl.
CPC ........ *B25J 9/1664* (2013.01); *G05B 19/4155* (2013.01); *G05B 2219/45084* (2013.01)

(58) Field of Classification Search
CPC ...... B25J 9/1679; B25J 11/008; B25J 9/1664; B25J 5/007; G05B 19/4155; G05B 2219/45084
See application file for complete search history.

(56) References Cited

U.S. PATENT DOCUMENTS

| | | | | |
|---|---|---|---|---|
| 8,982,217 B1* | 3/2015 | Hickman | ............... | G05B 15/02 348/158 |
| 2001/0037915 A1* | 11/2001 | Abekawa | ............... | B60P 3/025 186/7 |
| 2005/0216126 A1* | 9/2005 | Koselka | ............. | G08B 21/0461 901/2 |
| 2007/0124024 A1* | 5/2007 | Okamoto | ............... | B25J 9/0003 700/245 |
| 2008/0258590 A1* | 10/2008 | Van De Sluis | ........... | G01J 3/50 362/125 |
| 2011/0298379 A1* | 12/2011 | Jung | ...................... | H05B 45/20 235/375 |
| 2012/0206050 A1 | 8/2012 | Spero | | |
| 2017/0011580 A1* | 1/2017 | Huang | ............... | G06Q 30/0631 |
| 2018/0336755 A1* | 11/2018 | Jin | ........................ | G07F 13/065 |

FOREIGN PATENT DOCUMENTS

| | | |
|---|---|---|
| KR | 101083700 B1 | 11/2011 |
| KR | 1020200085658 A | 7/2020 |
| WO | 2020179401 A1 | 9/2020 |

* cited by examiner

*Primary Examiner* — Stephen Holwerda
(74) *Attorney, Agent, or Firm* — Dinsmore & Shohl LLP; Yongsko Choi, Esq.

(57) ABSTRACT

A method for controlling a serving robot is provided. The method includes the steps of: acquiring first sensor data on at least one object placed on a support coupled to a serving robot, using at least one first sensor coupled to the serving robot; deciding whether the at least one object is a serving object on the basis of the first sensor data, and when the at least one object is decided to be a serving object, determining properties of illumination of the serving robot to be applied to the serving object on the basis of the first sensor data; and dynamically changing the properties of the illumination of the serving robot on the basis of information on surroundings acquired during travel of the serving robot.

13 Claims, 4 Drawing Sheets

METHOD, SYSTEM, AND NON-TRANSITORY COMPUTER-READABLE RECORDING MEDIUM FOR CONTROLLING A SERVING ROBOT

FIELD OF THE INVENTION

The present invention relates to a method, system, and non-transitory computer-readable recording medium for controlling a serving robot.

BACKGROUND

Serving means providing objects including drinks or food to customers in a place such as a restaurant. In recent years, robots and the like have been developed and used for serving in place of, or rendering assistance to, waiters or waitresses. Such a robot usually functions to take food orders or carry out serving according to the orders, and may perform autonomous navigation using table position information or the like. The robot may comprise a transport means (including sensors for avoiding obstacles), a display means for menu output or order input, and the like. Further, the robot may include a means for placing or carrying food or food containers.

As an example of related conventional techniques, Korean Registered Patent Publication No. 10-1083700 discloses a restaurant serving robot system for taking orders in a restaurant and transporting a tray where ordered food is placed, the system comprising: an upper part including a pair of articulated robot arms which are synchronously driven, and a tray holding part rotatably coupled to a lower end of the articulated robot arms and configured to fix the tray; a lower part at a bottom part of which a robot moving part including a main wheel and one or more auxiliary wheels is provided; a middle part fixed to the lower part and rotatably connected to the upper part; and a control part configured to control the operations of the pair of articulated robot arms, the tray holding part, and the robot moving part, wherein the tray holding part comprises: a hand rotatably coupled to an end of the articulated robot arms; a fixing part provided at the hand to move upward and downward; a gripper positioned at a bottom part of the tray and coupled to the fixing part; a stopper positioned at a top part of the tray and coupled to the fixing part to face the gripper; a switch pressed by the fixing part which moves upward when the stopper is pressed by the tray at the same time the end of the articulated robot arms is driven downward; a spring contracted when the fixing part moves upward; and a gripper angle detection unit configured to detect an angle of the gripper.

Meanwhile, according to the results of several studies, appropriate illumination on food (hereinafter, food includes drinks) makes the food look more appetizing (or fresher) depending on the type or nature of the food. For example, it is said that illuminating red-colored food such as bread or meat with light of a color temperature (or correlated color temperature) of 3,000 to 4,000 Kelvin makes the food stand out and look appetizing, and illuminating food such as sashimi or vegetables with light of a color temperature of about 5,000 Kelvin makes the food look fresher. However, the techniques introduced so far as well as the above-described conventional technique have failed to suggest making food served by a serving robot look more appetizing by appropriately illuminating the food according to the type or nature of the food.

In this connection, the inventor(s) present a technique for determining properties of illumination of a serving robot such that the serving robot appropriately illuminates a serving object according to a type or nature of the serving object, and dynamically changing the properties of the illumination of the serving robot in consideration of surroundings changed as the serving robot travels to transport the serving object.

SUMMARY OF THE INVENTION

One object of the present invention is to solve all the above-described problems in the prior art.

Another object of the invention is to: acquire sensor data on at least one object placed on a support coupled to a serving robot, using at least one sensor coupled to the serving robot; decide whether the at least one object is a serving object on the basis of the sensor data, and when the at least one object is decided to be a serving object, determine properties of illumination of the serving robot to be applied to the serving object on the basis of the sensor data; and dynamically change the properties of the illumination of the serving robot on the basis of information on surroundings acquired during travel of the serving robot.

Yet another object of the invention is to make a serving object look more appetizing by determining properties of illumination of a serving robot such that the serving robot appropriately illuminates the serving object according to a type or nature of the serving object, and dynamically changing the properties of the illumination of the serving robot in consideration of surroundings changed as the serving robot travels to transport the serving object.

The representative configurations of the invention to achieve the above objects are described below.

According to one aspect of the invention, there is provided a method for controlling a serving robot, the method comprising the steps of: acquiring first sensor data on at least one object placed on a support coupled to a serving robot, using at least one first sensor coupled to the serving robot; deciding whether the at least one object is a serving object on the basis of the first sensor data, and when the at least one object is decided to be a serving object, determining properties of illumination of the serving robot to be applied to the serving object on the basis of the first sensor data; and dynamically changing the properties of the illumination of the serving robot on the basis of information on surroundings acquired during travel of the serving robot.

According to another aspect of the invention, there is provided a system for controlling a serving robot, the system comprising: a sensor data acquisition unit configured to acquire first sensor data on at least one object placed on a support coupled to a serving robot, using at least one first sensor coupled to the serving robot; and an illumination property management unit configured to decide whether the at least one object is a serving object on the basis of the first sensor data, and when the at least one object is decided to be a serving object, determine properties of illumination of the serving robot to be applied to the serving object on the basis of the first sensor data, and to dynamically change the properties of the illumination of the serving robot on the basis of information on surroundings acquired during travel of the serving robot.

In addition, there are further provided other methods and systems to implement the invention, as well as non-transitory computer-readable recording media having stored thereon computer programs for executing the methods.

According to the invention, it is possible to: acquire sensor data on at least one object placed on a support coupled to a serving robot, using at least one sensor coupled to the serving robot; decide whether the at least one object is a serving object on the basis of the sensor data, and when the at least one object is decided to be a serving object, determine properties of illumination of the serving robot to be applied to the serving object on the basis of the sensor data; and dynamically change the properties of the illumination of the serving robot on the basis of information on surroundings acquired during travel of the serving robot.

According to the invention, it is possible to make a serving object look more appetizing by determining properties of illumination of a serving robot such that the serving robot appropriately illuminates the serving object according to a type or nature of the serving object, and dynamically changing the properties of the illumination of the serving robot in consideration of surroundings changed as the serving robot travels to transport the serving object.

DETAILED DESCRIPTION OF THE INVENTION

Figure 1:
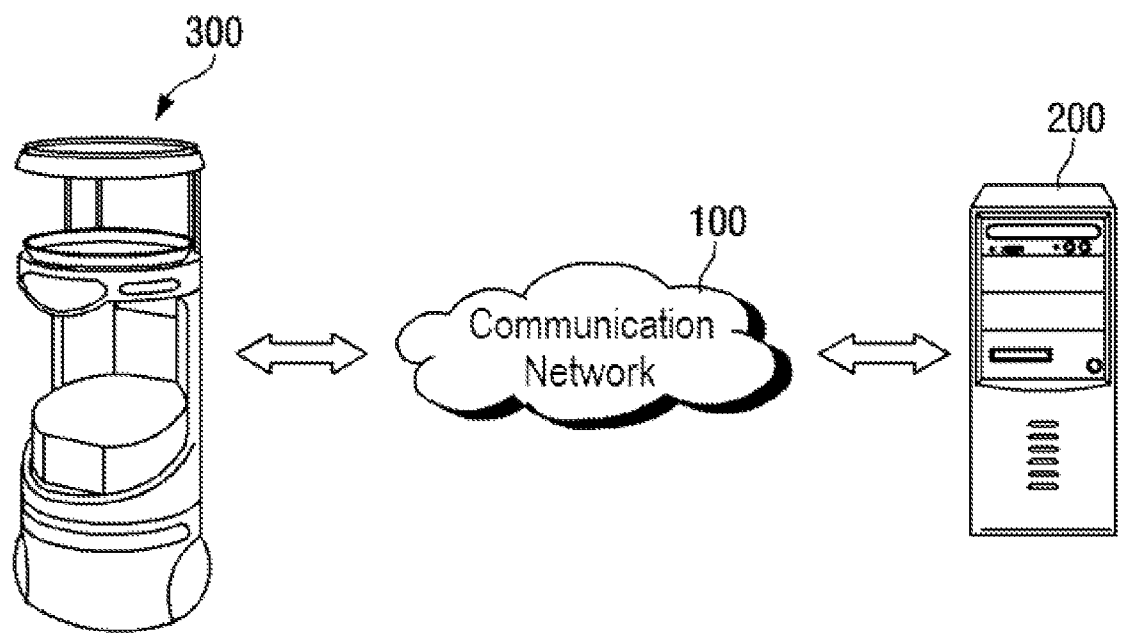
FIG. 1 schematically shows the configuration of an entire system for controlling a serving robot according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of the Entire System

FIG. 1 schematically shows the configuration of the entire system for controlling a serving robot according to one embodiment of the invention.

As shown in FIG. 1, the entire system according to one embodiment of the invention may comprise a communication network 100, a robot control system 200, and a serving robot 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as WiFi® communication, Wi-Fi Direct® communication, Long Term Evolution (LTE™) communication, 5G communication, BLUETOOTH® communication (including BLUETOOTH® Low Energy (BLE) communication), infrared communication, and ultrasonic communication. As another example, the communication network 100 may be an optical communication network, at least a part of which may be implemented with a conventional communication scheme such as Li-Fi (Light Fidelity).

Next, the robot control system 200 according to one embodiment of the invention may function to: acquire first sensor data on at least one object placed on a support coupled to a serving robot, using at least one first sensor coupled to the serving robot; decide whether the at least one object is a serving object on the basis of the first sensor data, and when the at least one object is decided to be a serving object, determine properties of illumination of the serving robot to be applied to the serving object on the basis of the first sensor data; and dynamically change the properties of the illumination of the serving robot on the basis of information on surroundings acquired during travel of the serving robot.

The configuration and functions of the robot control system 200 according to the invention will be discussed in more detail below.

Next, the serving robot 300 according to one embodiment of the invention is a device capable of communicating with the robot control system 200 via the communication network 100 and performing predetermined functions or assigned tasks (e.g., serving food, retrieving containers, etc.) autonomously without any operation of a user (e.g., an employee or a customer), and may include a support configured to support at least one object. The serving robot 300 according to one embodiment of the invention may include at least one of a module (e.g., a grab or a robotic arm module) for loading and unloading an object (e.g., a food tray), an imaging module (e.g., a visible light camera or an infrared camera) for acquiring images of surroundings, a scanner module (e.g., a LIDAR sensor) for acquiring information on obstacles, a sound acquisition module (e.g., a microphone) for acquiring sounds of surroundings, a display and speaker module for providing images and sounds, and a drive module (e.g., a motor) for moving the serving robot 300.

For example, the serving robot 300 may have characteristics or functions similar to those of at least one of a guide robot, a transport robot, a cleaning robot, a medical robot, an entertainment robot, a pet robot, and an unmanned flying robot. Meanwhile, supporting of an object herein should be interpreted as encompassing supporting of a container for containing an object such as food, a means where the container may be placed (e.g., a tray), or the like.

Meanwhile, according to one embodiment of the invention, the serving robot 300 may include an application (not shown) for controlling the serving robot 300 according to the invention. The application may be downloaded from the robot control system 200 or an external application distribution server (not shown). According to one embodiment of the invention, the characteristics of the application may be generally similar to those of a sensor data acquisition unit 210, an illumination property management unit 220, a communication unit 230, and a control unit 240 of the robot control system 200 to be described below. Here, at least a part of the application may be replaced with a hardware device or a firmware device that may perform a substantially equal or equivalent function, as necessary.

Figure 3:
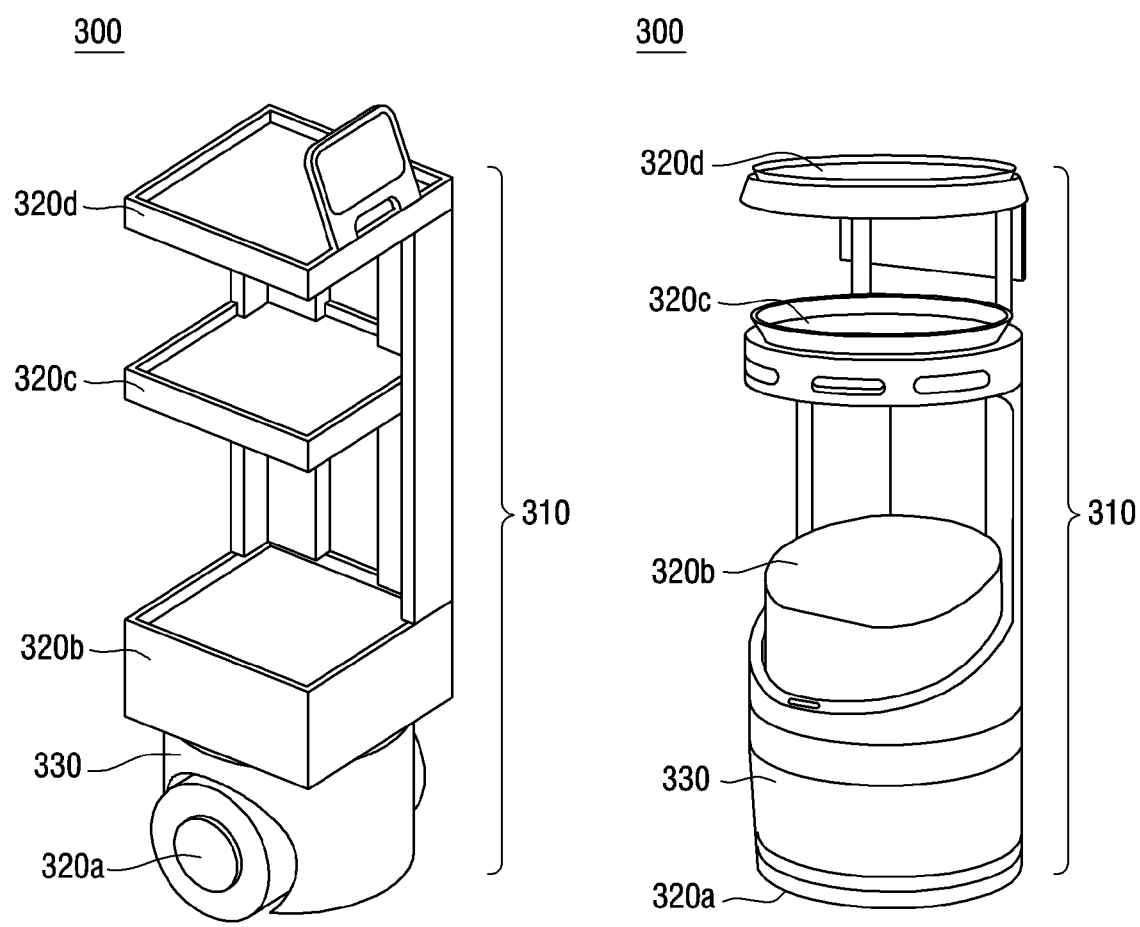
FIG. 3 illustratively shows the structure of a serving robot according to one embodiment of the invention.
Figure 4:
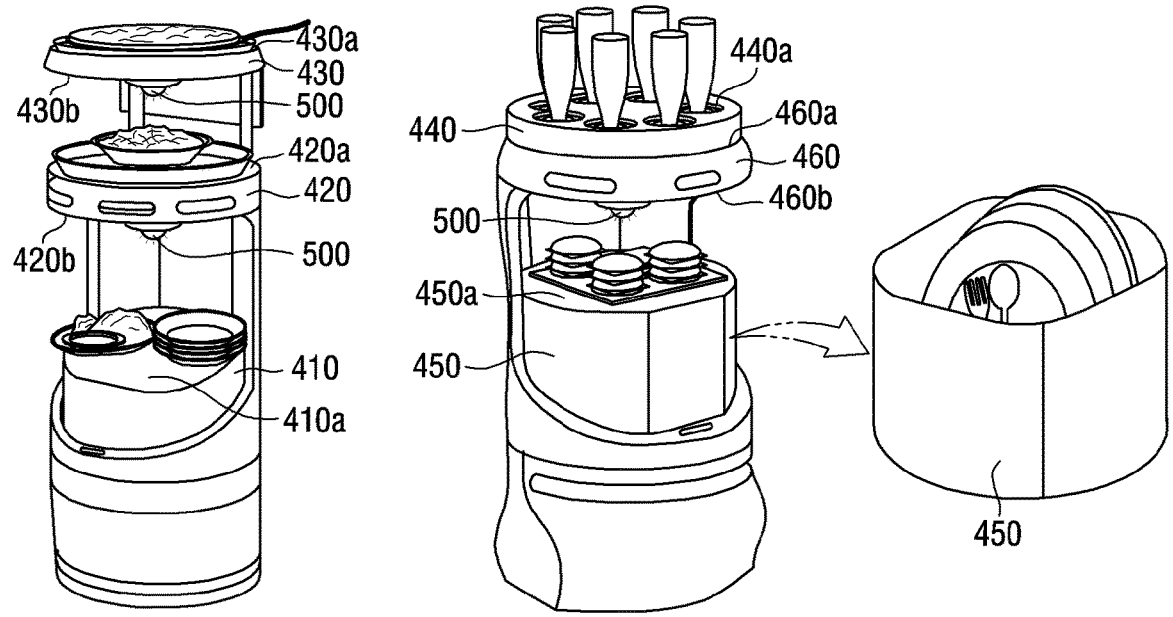
FIG. 4 illustratively shows the structure of a serving robot according to one embodiment of the invention.

FIGS. 3 and 4 illustratively show the structure of the serving robot 300 according to one embodiment of the invention.

Referring to FIG. 3, the serving robot 300 may comprise a main body 310, a drive unit 320a, and a processor 330.

First, the main body 310 according to one embodiment of the invention may be coupled to supports 320b, 320c, and 320d configured to support at least one object. According to one embodiment of the invention, the supports 320b, 320c, and 320d may be removably coupled for cleaning, replacement, or the like. Further, each of the supports 320b, 320c, and 320d may include a weight sensor (not shown) for sensing a weight supported by each of the supports 320b, 320c, and 320d. According to one embodiment of the invention, the weight sensor may be implemented using one or more strain gauges (e.g., three strain gauges, four strain gauges, or the like). In addition, according to one embodiment of the invention, the weight sensor may be coupled to the processor 330.

Further, the main body 310 according to one embodiment of the invention may include an image sensor (not shown) configured to photograph a spatial region above each of the supports 320b, 320c, and 320d, in place of or in addition to the weight sensor. Meanwhile, according to one embodiment of the invention, the image sensors configured to photograph the spatial regions above the respective supports 320b, 320c, and 320d are not necessarily included in the main body 310, and at least some of the image sensors may be installed on a structure in a serving place.

Meanwhile, the main body 310 according to one embodiment of the invention may include at least one loading space for loading an object. Further, according to one embodiment of the invention, the at least one loading space may include the supports 320b, 320c, and 320d. The object according to one embodiment of the invention may refer to all material objects that can be moved by the serving robot 300, and may encompass things, animals, and the like. For example, the object according to one embodiment of the invention may include a serving object such as food and a bussing object such as a container containing the food.

Referring to FIG. 4, the serving robot 300 according to one embodiment of the invention may include a first space 410 and a second space 420 for providing a serving object (i.e., serving) and collecting a bussing object (i.e., bussing). Further, the serving robot 300 may further include a third space 430 that is an expansion space provided via a removable pillar, and more loading spaces may be provided by adding more expansion spaces as needed. Further, the serving robot 300 may further include a tray 440 dedicated for the serving object or the bussing object. For example, the tray 440 may be configured such that a plurality of circular grooves are formed on its top side as seen from the top. Each of the circular grooves may be formed such that the lower part of a cup containing a drink is seated and easily fixed to some extent. The sizes of the circular grooves may be diverse. Further, the lower part of the first space 410 of the serving robot 300 may include a fourth space 450 that may be taken out through a lateral side of the serving robot 300. The fourth space 450 according to one embodiment of the invention may have a shape similar to a basket, such that an empty space is formed therein; a lateral side thereof is closed; a top side thereof is open; and a bottom side thereof is closed. However, the loading spaces of the serving robot 300 according to the invention are not necessarily limited to the above description, and may be diversely implemented as other types of loading spaces as long as the objects of the invention may be achieved.

Referring further to FIG. 4, at least one light source 500 capable of illuminating a serving object may be coupled to the serving robot 300 according to one embodiment of the invention. According to one embodiment of the invention, the light source 500 may refer to an incandescent lamp, a three-wavelength lamp, a fluorescent lamp, an LED lamp, or the like, and may be disposed in various positions to enable illumination on the serving object. For example, the light source 500 according to one embodiment of the invention may be disposed in at least a part of an upper portion 410a, 420a, 430a, 450a, 460a and/or a lower portion 420b, 430b, 460b of at least one space 410, 420, 430, 450, 460 for providing the serving object and collecting the bussing object. As another example, the light source 500 according to one embodiment of the invention may be disposed in at least a part (e.g., a circular groove 440a) of the tray 440 dedicated for the serving object or the bussing object.

However, the type or disposed position of the light source 500 according to one embodiment of the invention is not limited to the above description, and may be diversely changed as long as the objects of the invention may be achieved.

Next, referring to FIG. 3 again, the drive unit 320a according to one embodiment of the invention may comprise a module for moving the main body 310 to other locations. For example, the drive unit 320a may include a module related to electrically, mechanically, or hydraulically driven wheels, propellers, or the like as the module for moving the main body 310 to other locations.

Next, the processor 330 according to one embodiment of the invention may be electrically connected to the drive unit 320a to perform a function of controlling the drive unit 320a (and may include a communication module for communicating with an external system). For example, the processor 330 may be a data processing device that are embedded in hardware and have circuits physically structured to perform codes included in a program or functions represented by instructions. For example, such a data processing device embedded in hardware may include a processing device such as a microprocessor, a central processing unit, a processor core, a multiprocessor, an application-specific integrated circuit (ASIC), and a field programmable gate array (FPGA).

Further, the processor 330 may perform the functions of at least one of the sensor data acquisition unit 210 and the illumination property management unit 220 of the robot control system 200 according to the invention (e.g., the corresponding functions may be modularized and included in the processor 330), and may function to control the drive unit 320a through communication with an external system (not shown) that performs the functions of at least one of the sensor data acquisition unit 210 and the illumination property management unit 220.

Specifically, the processor 330 may function to: acquire first sensor data on at least one object placed on a support coupled to a serving robot, using at least one first sensor coupled to the serving robot; decide whether the at least one object is a serving object on the basis of the first sensor data, and when the at least one object is decided to be a serving object, determine properties of illumination of the serving robot to be applied to the serving object on the basis of the first sensor data; and dynamically change the properties of the illumination of the serving robot on the basis of information on surroundings acquired during travel of the serving robot.

Configuration of the Robot Control System

Hereinafter, the internal configuration of the robot control system 200 crucial for implementing the invention and the functions of the respective components thereof will be discussed.

Figure 2:
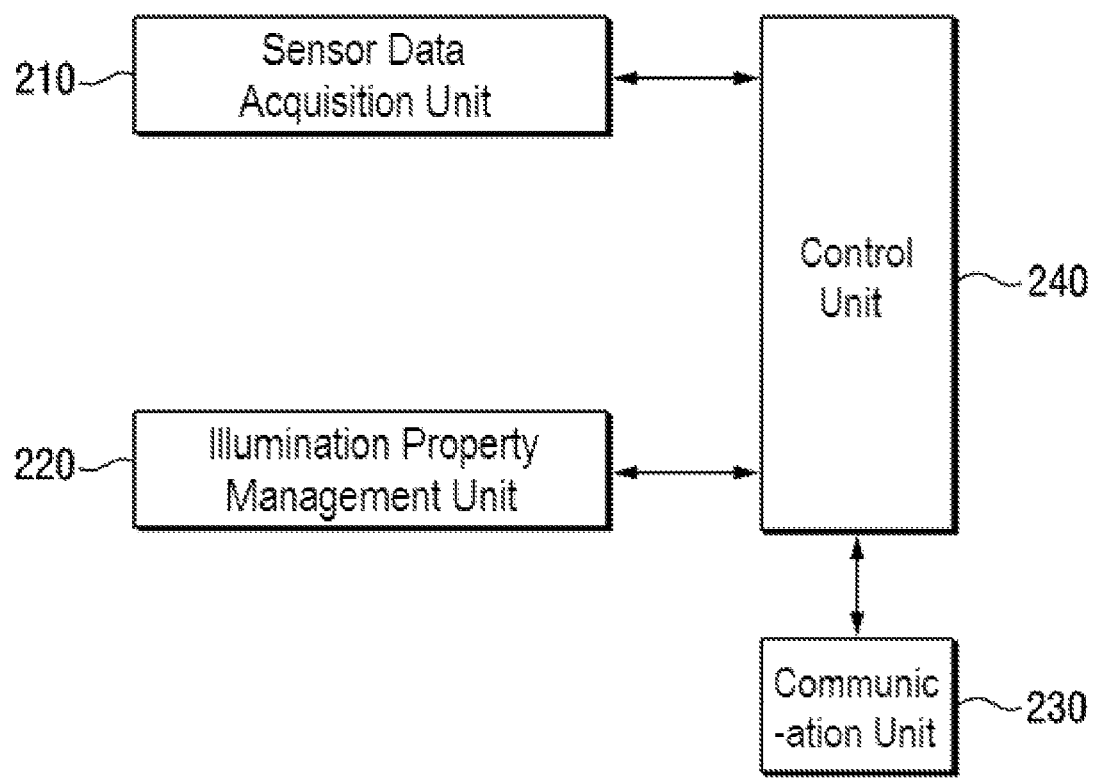
FIG. 2 specifically shows the internal configuration of a robot control system according to one embodiment of the invention.

FIG. 2 specifically shows the internal configuration of the robot control system 200 according to one embodiment of the invention.

As shown in FIG. 2, the robot control system 200 according to one embodiment of the invention may comprise a sensor data acquisition unit 210, an illumination property management unit 220, a communication unit 230, and a control unit 240. According to one embodiment of the invention, at least some of the sensor data acquisition unit 210, the illumination property management unit 220, the communication unit 230, and the control unit 240 may be program modules that communicate with an external system. The program modules may be included in the robot control system 200 in the form of operating systems, application program modules, and other program modules, while they may be physically stored in a variety of commonly known storage devices. Further, the program modules may also be stored in a remote storage device that may communicate with the robot control system 200. Meanwhile, such program modules may include, but are not limited to, routines, subroutines, programs, objects, components, and data structures for performing specific tasks or executing specific abstract data types according to the invention as will be described below.

Meanwhile, the above description is illustrative although the robot control system 200 has been described as above, and it will be apparent to those skilled in the art that at least a part of the components or functions of the robot control system 200 may be implemented or included in the serving robot 300 or an external system (not shown), as necessary. Further, in some cases, all of the functions and components of the robot control system 200 may be implemented or included in the serving robot 300.

First, the sensor data acquisition unit 210 according to one embodiment of the invention may function to acquire first sensor data on at least one object placed on a support coupled to a serving robot 300, using at least one first sensor coupled to the serving robot 300.

Specifically, a support may be coupled to the serving robot 300 according to one embodiment of the invention, and at least one object (e.g., a serving object or a bussing object) may be placed on the support. Further, at least one first sensor (not shown) for acquiring first sensor data on the at least one object may be coupled to the serving robot 300 according to one embodiment of the invention.

More specifically, the first sensor data acquired by the sensor data acquisition unit 210 according to one embodiment of the invention using the first sensor may include, in a narrow sense, sensor data for deciding whether at least one object placed on the support is a serving object. According to one embodiment of the invention, the serving object refers to an object transported by the serving robot 300 to be provided to a customer, and should be distinguished from an object retrieved by the serving robot 300 from the customer for washing or the like (i.e., a bussing object). Further, the serving object mostly refers to food but does not exclude dinnerware or other tools for eating.

For example, as described above, the first sensor data according to one embodiment of the invention may include image data acquired from an image sensor with respect to at least one object placed on the support. That is, the sensor data acquisition unit 210 according to one embodiment of the invention may acquire an image photographed by an image sensor configured to photograph a spatial region above the support, or a change in the image, as the first sensor data on at least one object placed on the support. Further, the sensor data acquisition unit 210 according to one embodiment of the invention may acquire a weight sensed by a weight sensor included in the support, or a change in the weight, as weight data on the support to decide whether at least one object is placed on the support on the basis of the weight data, and then only when at least one object is placed on the support, may allow the image sensor to acquire the image data on the at least one object as the first sensor data.

In addition, the first sensor data acquired by the sensor data acquisition unit 210 according to one embodiment of the invention using the first sensor may include, in a broad sense, not only the sensor data for deciding whether at least one object placed on the support is a serving object, but also sensor data for determining properties of illumination of the serving robot 300 to be applied to the at least one object when the at least object is a serving object. For example, the first sensor data on the at least one object may further include illuminance/luminance data acquired from an illuminance/luminance sensor (which may be configured as a part of the image sensor) with respect to the at least one object, temperature/humidity data acquired from a temperature/humidity sensor with respect to the at least one object, and the like.

However, the first sensor data on at least one object placed on the support coupled to the serving robot 300 according to one embodiment of the invention is not limited to the above description, and may be diversely changed as long as the objects of the invention may be achieved. Further, according to one embodiment of the invention, it should be understood that the first sensor data may be acquired with respect to each of the at least one object placed on the support.

Meanwhile, as will be described below, the illumination property management unit 220 according to one embodiment of the invention may decide whether at least one object placed on the support is a serving object on the basis of the first sensor data. Further, when the at least one object is decided to be a serving object, the sensor data acquisition unit 210 according to one embodiment of the invention may acquire second sensor data on the serving object using at least one second sensor coupled to the serving robot 300. Here, according to one embodiment of the invention, the second sensor data may be acquired with respect to each of the at least one object placed on the support.

Specifically, the sensor data acquisition unit 210 according to one embodiment of the invention may acquire only sensor data for deciding whether at least one object placed on the support is a serving object (e.g., image data on the at least one object) as the first sensor data on the at least one object, prior to acquiring the second sensor data. Further, only when the at least one object is decided to be a serving object by the illumination property management unit 220 according to one embodiment of the invention, the sensor data acquisition unit 210 according to one embodiment of the invention may acquire sensor data for determining properties of illumination of the serving robot 300 to be applied to the serving object (e.g., illuminance/luminance/temperature/humidity data on the serving object) as the second sensor data on the serving object.

That is, although the sensor data acquisition unit 210 according to one embodiment of the invention may acquire all sensor data on at least one object placed on the support as the first sensor data (i.e., the first sensor data in the broad sense as described above) regardless of whether the at least one object is a serving object, only sensor data necessary for deciding whether the at least one object is a serving object may be preferentially acquired as the first sensor data (i.e., the first sensor data in the narrow sense as described above). Further, the sensor data acquisition unit 210 according to one embodiment of the invention may acquire the other sensor data not belonging to the first sensor data in the narrow sense as the second sensor data only when the at least one object is a serving object, so that the second sensor for acquiring the second sensor data may be operated more efficiently in terms of lifespan or power consumption.

Next, the illumination property management unit 220 according to one embodiment of the invention may function to decide whether the at least one object placed on the support coupled to the serving robot 300 is a serving object, on the basis of the first sensor data on the at least one object.

For example, when the first sensor data according to one embodiment of the invention includes image data on the at least one object placed on the support, the illumination property management unit 220 according to one embodiment of the invention may process the image data on the at least one object using a machine learning-based object recognition model for objects that may be placed on the support, thereby deciding whether the at least one object is a serving object and specifically recognizing what the at least one object is. Here, according to one embodiment of the invention, the object recognition model may be implemented using an algorithm such as R-CNN (Region-based Convolutional Neural Network), YOLO (You Only Look Once), and SSD (Single Shot Detector). However, the object recognition model is not necessarily limited to the foregoing and may be diversely changed as long as the objects of the invention may be achieved.

Meanwhile, when the first sensor data according to one embodiment of the invention further includes at least one of illuminance data, luminance data, temperature data, and humidity data on the at least one object placed on the support in addition to the image data on the at least one object, the illumination property management unit 220 according to one embodiment of the invention may decide whether the at least one object is a serving object or specifically recognize what the at least one object is, on the further basis of such data.

Further, in cases where the at least one object placed on the support coupled to the serving robot 300 is decided to be a serving object (the cases where the at least one object is recognized as a specific serving object are included, which also applies to the above and following descriptions), the illumination property management unit 220 according to one embodiment of the invention may determine properties of illumination of the serving robot 300 to be applied to the serving object on the basis of the first sensor data on the serving object.

Specifically, at least one light source 500 for illuminating the serving object may be coupled to the serving robot 300 according to one embodiment of the invention. According to one embodiment of the invention, the light source 500 may be configured to apply illumination of various properties to the serving object by adjusting its power, mode, direction, angle, and the like. Otherwise, according to one embodiment of the invention, the light source 500 may be configured to apply illumination of various properties to the serving object by combining a plurality of light sources 500 in various ways. Meanwhile, according to one embodiment of the invention, the properties of the illumination may include at least one of a color temperature, color rendering, illuminance, irradiation angle, and irradiation direction of the illumination, but are not limited to the foregoing and may be diversely changed as long as the objects of the invention may be achieved.

Further, the illumination property management unit 220 according to one embodiment of the invention may analyze a type and/or nature of the serving object (e.g., a color of the serving object) on the basis of the first sensor data on the serving object (e.g., the image data on the serving object), and may determine the properties of the illumination so that suitable illumination may be applied to the serving object according to a result of the analysis. In addition, the illumination property management unit 220 according to one embodiment of the invention may appropriately control the light source 500 such that the serving object is illuminated according to the determined properties of the illumination.

Meanwhile, when the sensor data acquisition unit 210 according to one embodiment of the invention acquires sensor data on the at least one object placed on the support as the first sensor data and the second sensor data as described above, the illumination property management unit 220 according to one embodiment of the invention may determine the properties of the illumination of the serving robot 300 on the basis of both the first sensor data and the second sensor data.

Meanwhile, when the at least one object placed on the support coupled to the serving robot 300 is decided to be not a serving object, the illumination property management unit 220 according to one embodiment of the invention may cause the illumination of the serving robot 300 not to be applied to the at least one object.

For example, when the at least one object placed on the support is an object retrieved from a customer for washing or the like (i.e., a bussing object), the illumination property management unit 220 according to one embodiment of the invention may control the light source 500 such that the bussing object is not illuminated.

Meanwhile, the illumination property management unit 220 according to one embodiment of the invention may dynamically change the properties of the illumination of the serving robot 300 on the basis of information on surroundings acquired during travel of the serving robot 300.

Specifically, when a serving object is placed on the support, the serving robot 300 according to one embodiment of the invention may travel to a specific location (e.g., a table where a customer is seated) to provide the serving object to the customer. While the serving robot 300 travels as above, a difference may occur between properties of light actually applied to the serving object and the properties of the illumination determined by the illumination property management unit 220 according to one embodiment of the invention, due to lighting conditions or influence of light sources other than the light source 500 coupled to the serving robot 300 (e.g., a light source installed on a structure in a restaurant), for example. Therefore, the serving robot 300 according to one embodiment of the invention may dynamically change the properties of the illumination of the serving robot 300 in a manner to eliminate the above difference, on the basis of information on surroundings (e.g., the lighting conditions or the influence of other light sources) acquired during the travel of the serving robot 300, so that appropriate illumination may be continuously applied to the serving object regardless of changes in the surroundings that occur during the travel of the serving robots 300. The sensor data acquisition unit 210 according to one embodiment of the invention may acquire the information on the surroundings during the travel of the serving robot 300, wherein the information on the surroundings may be acquired from a separate sensor (e.g., a sensor other than the first sensor and the second sensor among the sensors coupled to the serving robot 300, or a sensor installed on a structure other than the serving robot 300), or may be acquired by continuously monitoring changes in the first sensor data and/or the second sensor data acquired from the first sensor and/or the second sensor coupled to the serving robot 300.

In addition, when the serving object is removed from the support coupled to the serving robot 300, the illumination property management unit 220 according to one embodiment of the invention may determine properties of illumination around the serving object to be applied to the serving object, on the basis of ambient information on the serving object.

Specifically, as in the case where the serving robot 300 arrives at the location for providing the serving object to the customer (e.g., the table where the customer is seated) and actually provides the serving object, when the serving object is removed from the support coupled to the serving robot 300 and placed at a new position (e.g., on the table where the customer is seated), it may be necessary to apply appropriate illumination to the serving object even at the new position. To this end, the illumination property management unit 220 according to one embodiment of the invention may provide information on the determined properties of the illumination of the serving robot 300 to an external illumination system (e.g., a system for controlling lights installed on a ceiling or a table in a restaurant) so that the external illumination system may determine the properties of the illumination around the serving object.

Otherwise, the sensor data acquisition unit 210 according to one embodiment of the invention may acquire the ambient information on the serving object, and the illumination property management unit 220 according to one embodiment of the invention may determine the properties of the illumination around the serving object. In this case, according to one embodiment of the invention, the ambient information on the serving object may be acquired from a separate sensor (e.g., a sensor other than the first sensor and the second sensor among the sensors coupled to the serving robot 300, or a sensor installed on a structure other than the serving robot 300).

Next, the communication unit 230 according to one embodiment of the invention may function to enable data transmission/reception from/to the sensor data acquisition unit 210 and the illumination property management unit 220.

Lastly, the control unit 240 according to one embodiment of the invention may function to control data flow among the sensor data acquisition unit 210, the illumination property management unit 220, and the communication unit 230. That is, the control unit 240 according to one embodiment of the invention may control data flow into/out of the robot control system 200 or data flow among the respective components of the robot control system 200, such that the sensor data acquisition unit 210, the illumination property management unit 220, and the communication unit 230 may carry out their particular functions, respectively.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for controlling a serving robot, the method comprising the steps of:

acquiring first sensor data on at least one object placed on a support coupled to a serving robot, using at least one first sensor coupled to the serving robot;

deciding whether the at least one object is a serving object on the basis of the first sensor data, and in response to deciding that the at least one object is a serving object, determining properties of illumination of the serving robot to be applied to the serving object on the basis of the first sensor data; and dynamically changing the properties of the illumination of the serving robot on the basis of information on surroundings acquired during travel of the serving robot, wherein in the changing step, the properties of the illumination of the serving robot are dynamically changed in a manner to eliminate a difference between properties of light actually applied to the serving object and the determined properties of the illumination of the serving robot, and wherein in the changing step, in response to determining that the serving object is removed from the support and placed at a new position, properties of illumination around the serving object to be applied to the serving object at the new position are determined on the basis of ambient information on the serving object at the new position.

2. The method of claim 1, wherein in the acquiring step, in response to deciding that the at least one object is a serving object, second sensor data on the serving object is acquired using at least one second sensor coupled to the serving robot, and wherein in the determining step, the properties of the illumination of the serving robot are determined on the further basis of the second sensor data.

3. The method of claim 1, wherein in the determining step, in response to deciding that the at least one object is not a serving object, the illumination of the serving robot is not applied to the at least one object.

4. The method of claim 2, wherein the first sensor data includes image data on the at least one object, and the second sensor data includes at least one of illuminance data, luminance data, temperature data, and humidity data on the serving object.

5. The method of claim 1, wherein the properties of the illumination of the serving robot include at least one of a color temperature, color rendering, illuminance, irradiation angle, and irradiation direction of the illumination of the serving robot.

6. A non-transitory computer-readable recording medium having stored thereon a computer program for executing the method of claim 1.

7. The method of claim 1, further comprising:
providing, to an external illumination system, information on the determined properties of the illumination of the serving robot.

8. A system for controlling a serving robot, the system comprising:
a sensor data acquisition unit configured to acquire first sensor data on at least one object placed on a support coupled to a serving robot, using at least one first sensor coupled to the serving robot; and
an illumination property management unit configured to decide whether the at least one object is a serving object on the basis of the first sensor data, and in response to deciding that the at least one object is a serving object, determine properties of illumination of the serving robot to be applied to the serving object on the basis of the first sensor data, and to dynamically change the properties of the illumination of the serving robot on the basis of information on surroundings acquired during travel of the serving robot, wherein the illumination property management unit is configured to dynamically change the properties of the illumination of the serving robot in a manner to eliminate a difference between properties of light actually applied to the serving object and the determined properties of the illumination of the serving robot, and wherein the illumination property management unit is configured to, in response to determining that the serving object is removed from the support and placed at a new position, determine properties of illumination around the serving object to be applied to the serving object at the new position, on the basis of ambient information on the serving object at the new position.

9. The system of claim 8, wherein the sensor data acquisition unit is configured to, in response to deciding that the at least one object is a serving object, acquire second sensor data on the serving object using at least one second sensor coupled to the serving robot, and wherein the illumination property management unit is configured to determine the properties of the illumination of the serving robot on the further basis of the second sensor data.

10. The system of claim 9, wherein the first sensor data includes image data on the at least one object, and the second sensor data includes at least one of illuminance data, luminance data, temperature data, and humidity data on the serving object.

11. The system of claim 8, wherein the illumination property management unit is configured to, in response to deciding that the at least one object is not a serving object, cause the illumination of the serving robot not to be applied to the at least one object.

12. The system of claim 8, wherein the properties of the illumination of the serving robot include at least one of a color temperature, color rendering, illuminance, irradiation angle, and irradiation direction of the illumination of the serving robot.

13. The system of claim 8, wherein the illumination property management unit is further configured to provide, to an external illumination system, information on the determined properties of the illumination of the serving robot.

* * * * *